United States Patent
Sogo et al.

(10) Patent No.: US 9,131,286 B2
(45) Date of Patent: Sep. 8, 2015

(54) DEVICE MANAGEMENT SYSTEM AND PROGRAM

(75) Inventors: Tomoya Sogo, Osaka (JP); Misayo Kobayashi, Osaka (JP); Akio Nakano, Osaka (JP); Yoshifumi Murakami, Osaka (JP); Toru Shimotsuma, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 170 days.

(21) Appl. No.: 14/117,327
(22) PCT Filed: May 15, 2012
(86) PCT No.: PCT/JP2012/062393
§ 371 (c)(1),
(2), (4) Date: Nov. 12, 2013
(87) PCT Pub. No.: WO2012/161030
PCT Pub. Date: Nov. 29, 2012

(65) Prior Publication Data
US 2015/0116129 A1   Apr. 30, 2015

(30) Foreign Application Priority Data
May 24, 2011   (JP) .................................. 2011-115960

(51) Int. Cl.
*H04Q 9/00* (2006.01)
*G01S 19/34* (2010.01)
(Continued)

(52) U.S. Cl.
CPC ................ *H04Q 9/00* (2013.01); *G01C 21/005* (2013.01);
(Continued)

(58) Field of Classification Search
CPC ...... H04L 67/18; H04Q 9/00; H04Q 2209/40; H04Q 2209/50; H04Q 2209/60; H02J 13/00; G01C 21/005; G01S 19/13–19/48; G01S 2205/001–2205/008
See application file for complete search history.

(56) References Cited

U.S. PATENT DOCUMENTS 6,999,779 B1 *   2/2006   Hashimoto ................ 455/456.2
2002/0196458 A1 *  12/2002   Yoshiura et al. ............. 358/1.14
(Continued)

FOREIGN PATENT DOCUMENTS

| JP | 09-034537 A | 2/1997 |
| JP | 11-065641 A | 3/1999 |

(Continued)

OTHER PUBLICATIONS

International Search Report for corresponding International Application No. PCT/JP2012/062393 mailed Aug. 21, 2012.
(Continued)

*Primary Examiner* — Hai Phan
*Assistant Examiner* — Orlando Bousono
(74) *Attorney, Agent, or Firm* — Renner, Otto, Boisselle & Sklar, LLP

(57) ABSTRACT

An information analysis unit of a management apparatus searches for a device existing within a predetermined distance from a portable terminal, namely a device positioned near the portable terminal, based on terminal position information received from the portable terminal by a radio communication unit and device position information stored in an information storage unit. The information analysis unit reads, from the information storage unit, energy usage information of the searched device existing near the portable terminal, and transmits it from the radio communication unit to an information acquisition unit of the portable terminal. Thus, the information acquisition unit acquires only the energy usage information of the device positioned near the portable terminal, so that a display unit displays only the energy usage information of the device positioned near the portable terminal.

19 Claims, 10 Drawing Sheets

(51) Int. Cl.
*G01C 21/00* (2006.01)
*G01S 19/42* (2010.01)
*H04L 29/08* (2006.01)
*H02J 13/00* (2006.01)

(52) U.S. Cl.
CPC .................. *G01S 19/34* (2013.01); *G01S 19/42* (2013.01); *H02J 13/00* (2013.01); *H04L 67/18* (2013.01); *G01S 2205/001* (2013.01); *H04Q 2209/40* (2013.01); *H04Q 2209/50* (2013.01)

(56) References Cited

U.S. PATENT DOCUMENTS

| | | | |
|---|---|---|---|
| 2003/0139176 A1* | 7/2003 | Fujiwara et al. | 455/420 |
| 2003/0222797 A1* | 12/2003 | Futa et al. | 340/995.18 |
| 2004/0083121 A1* | 4/2004 | Nagao | 705/1 |
| 2004/0212827 A1* | 10/2004 | Otsuji et al. | 358/1.15 |
| 2004/0239530 A1* | 12/2004 | Izumi et al. | 340/990 |
| 2005/0148320 A1* | 7/2005 | Tanabe | 455/411 |
| 2006/0026038 A1* | 2/2006 | Omori et al. | 705/2 |
| 2006/0030334 A1* | 2/2006 | Hashimoto | 455/456.1 |
| 2006/0059018 A1* | 3/2006 | Shiobara et al. | 705/2 |
| 2006/0107208 A1* | 5/2006 | Sugimori et al. | 715/526 |
| 2006/0129352 A1* | 6/2006 | Fujiwara et al. | 702/182 |
| 2006/0259240 A1* | 11/2006 | Hashimoto | 701/213 |
| 2007/0150452 A1* | 6/2007 | Tsurumaki et al. | 707/3 |
| 2007/0198582 A1* | 8/2007 | Yamamichi et al. | 707/104.1 |
| 2007/0199069 A1* | 8/2007 | Ohtake et al. | 726/20 |
| 2008/0072042 A1* | 3/2008 | Okuyama et al. | 713/164 |
| 2008/0097846 A1* | 4/2008 | Oikawa et al. | 705/14 |
| 2008/0166053 A1* | 7/2008 | Furuhashi et al. | 382/190 |
| 2008/0198028 A1* | 8/2008 | Watanabe | 340/679 |
| 2009/0021395 A1* | 1/2009 | Maesono et al. | 340/901 |
| 2009/0043783 A1* | 2/2009 | Wakasa et al. | 707/10 |
| 2009/0061814 A1* | 3/2009 | Hamaue | 455/405 |
| 2009/0083469 A1* | 3/2009 | Tanaka | 710/305 |
| 2009/0248861 A1* | 10/2009 | Kato | 709/224 |
| 2009/0251733 A1* | 10/2009 | Otsuji et al. | 358/1.15 |
| 2010/0023140 A1* | 1/2010 | Kodama et al. | 700/83 |
| 2010/0076973 A1* | 3/2010 | Machida | 707/736 |
| 2010/0082730 A1* | 4/2010 | Fujimori | 709/202 |
| 2010/0231965 A1* | 9/2010 | Sunata | 358/1.15 |
| 2010/0274403 A1* | 10/2010 | Maeda et al. | 700/291 |

FOREIGN PATENT DOCUMENTS

| | | |
|---|---|---|
| JP | 2002-109203 A | 4/2002 |
| JP | 2002-175172 A | 6/2002 |
| JP | 2002-218560 A | 8/2002 |
| JP | 2005-018142 A | 1/2005 |
| JP | 2007-220012 A | 8/2007 |
| JP | 2008-152576 A | 7/2008 |
| JP | 2009-200841 A | 9/2009 |
| JP | 2009-265971 A | 11/2009 |

OTHER PUBLICATIONS

PCT/ISA/237 for corresponding International Application No. PCT/JP2012/062393 dated Aug. 21, 2012.

* cited by examiner

FIG. 3 A

|  | ILLUMINATION R1-1 | ILLUMINATION R1-2 | ... | AIR CONDITIONER Tm-2 | AIR CONDITIONER Tm-X |
|---|---|---|---|---|---|
| YYYY/MM/DD 00:01 | ON | ON | ... | OFF | OFF |
| YYYY/MM/DD 00:02 | ON | ON | ... | OFF | OFF |
| ... | ... | ... | ... | ... | ... |
| ... | ... | ... | ... | ... | ... |
| YYYY/MM/DD 24:00 | OFF | ON | ... | OFF | ON |

} CORRESPONDING TO STORAGE PERIOD

FIG. 3 B

|  | ILLUMINATION R1-1 | ILLUMINATION R1-2 | ... | AIR CONDITIONER Tm-2 | AIR CONDITIONER Tm-X |
|---|---|---|---|---|---|
| X | 10.000 | 12.000 | ... | 24.000 | 10.000 |
| Y | 5.000 | 5.000 | ... | 20.000 | 10.000 |
| FLOOR (Z) | 5.000 | 5.000 | ... | 10.000 | 15.000 |

FIG. 3 C

| EXECUTION DAY OF THE WEEK | DEVICE | EXECUTION TIME | CONTROL CONTENT | EXECUTION DAY OF THE WEEK |
|---|---|---|---|---|
| SCHEDULE 001 | ILLUMINATION R1-1 | 10 : 00 | ON | SUN. MON. TUES. WED. THUR. FRI. SAT. |
| SCHEDULE 002 | ILLUMINATION R1-1 | 20 : 00 | OFF | SUN. MON. TUES. WED. THUR. FRI. SAT. |
| ... | ... | ... | ... | ... |
| SCHEDULE ppp | AIR CONDITIONER Tm-X | 19 : 00 | OFF | MON. TUES. WED. THUR. FRI. |

FIG. 8
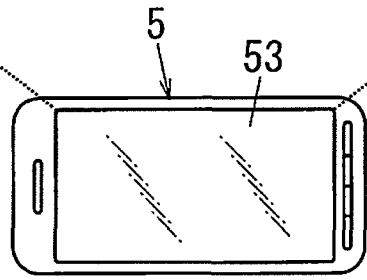
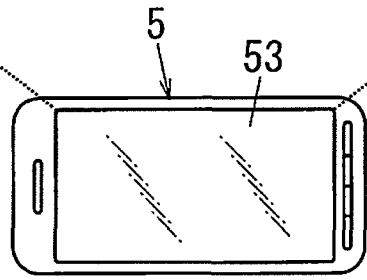

DEVICE MANAGEMENT SYSTEM AND PROGRAM

TECHNICAL FIELD

The present invention relates to a device management system and program for managing devices that are dispersedly disposed at a plurality of positions of a management area set in a building or the like.

BACKGROUND ART

Conventionally, as a system for managing devices (equipment) that are dispersedly disposed at a plurality of positions, systems where a manager (equipment inspector) patrols and inspects each device are proposed (for example, Japanese Unexamined Patent Application Publication No. 2008-152576). The equipment management apparatus disclosed in this document stores, correspondingly to a device, an equipment inspection record time calculated based on the position of the device and the position of a position detecting apparatus carried by the manager. Based on the average value, the equipment management apparatus calculates a repair demanding index that indicates the degree of requirement of repairing the device. Thus, a repair/update plan that can reduce the maintenance cost of the device can be created.

As a system for controlling illumination devices that are disposed in a facility as a monitoring target, a system is proposed where an illumination device is turned on correspondingly to the position of a moving body when the inside of the facility as the monitoring target is monitored using images acquired by a camera of the moving body (for example, Japanese Unexamined Patent Application Publication No. 2007-220012). The illumination control system disclosed in this document turns on an illumination device in a photographing range of the camera based on the position of the moving body and the area illuminated by the illumination device.

Recently, the spotlight has centered on energy saving. A manager who patrols a management area set in a building or the like must determine the existence of unnecessary energy consumption of devices that are dispersedly disposed at a plurality of positions of the management area. In other words, for example, when forgetting to turn off an illumination device occurs, the manager must early find the forgetting during patrol of the management area to minimize unnecessary energy consumption.

However, it is difficult that a manager such as a store manager in a store who does not have a technical knowledge related to devices (who does not accurately understand the arrangement and the number of installed devices) manages the using state of energy of each device during patrol of the management area. Therefore, there is a problem that it is difficult for some managers who patrol the management area to determine the existence of unnecessary energy consumption of the devices that are dispersedly disposed at a plurality of positions of the management area. The above-mentioned conventional system simply manages and controls the devices using the positions of the devices and the position of the manager or the moving body, and is not expected to manage the using state of energy by the devices. Therefore, the above-mentioned problems cannot be solved.

SUMMARY OF THE INVENTION

The present invention provides a device management system and program that allow a manager who patrols a management area to easily manage the using state of energy of each device.

A device management system of the present invention includes the following elements: a plurality of devices that are dispersedly disposed at a plurality of positions in a management area; a portable terminal carried by a manager who patrols the management area; and a management apparatus being capable of radio-communicating with the portable terminal. The management apparatus includes the following elements: an information collection unit configured to control energy usage information indicating the using state of energy by the plurality of devices; and an information storage unit configured to store, for each device, device position information that indicates the positions of the plurality of devices and the energy usage information. The portable terminal includes the following elements: a position acquisition unit configured to acquire terminal position information indicating the present position; an information acquisition unit configured to acquire the energy usage information from the management apparatus by radio communication; and a presentation unit configured to present the energy usage information. At least one of the management apparatus and portable terminal includes an information analysis unit that is configured to select the energy usage information to be presented by the presentation unit from the energy usage information stored in the information storage unit. Based on the terminal position information and device position information, the information analysis unit is configured to search the plurality of devices for a device existing within a predetermined distance from the portable terminal in the management area, and is configured to make the presentation unit present the energy usage information of the searched device.

In the present invention, the information analysis unit makes the presentation unit present the energy usage information of the device that exists within the predetermined distance from the portable terminal in the management area. Therefore, advantageously, the manager who patrols the management area can easily manage the using state of energy of each device.

In the device management system, preferably, using a predetermined determination rule and the energy usage information of the device that exists within the predetermined distance, the information analysis unit is configured to determine whether the using state of energy by the device that exists within the predetermined distance is reasonable or not. When it is determined that the using state is reasonable, the information analysis unit is configured to prevent the presentation unit from presenting the energy usage information of the device that exists within the predetermined distance. When it is determined that the using state is not reasonable, the information analysis unit is configured to make the presentation unit present the energy usage information of the device that exists within the predetermined distance.

More preferably, the device management system includes a terminal apparatus that is capable of communicating with the management apparatus and controls the operation state of each device. The management apparatus further includes a device control unit that is configured to control the operation state of each device in response to a control command by transmitting the control command to the terminal apparatus. The management apparatus also includes a timer configured to acquire time information indicating the present time. The information storage unit is configured to store an operation schedule including a combination of the control command and execution time for each device. Using the operation schedule as the predetermined determination rule, the information analysis unit is configured to determine whether the using state of energy by the device that exists within the predetermined distance is reasonable or not.

More preferably, the device management system includes a terminal apparatus that is capable of communicating with the management apparatus and controls the operation state of each device. The management apparatus further includes a device control unit that is configured to control the operation state of each device in response to a control command by transmitting the control command to the terminal apparatus. The portable terminal further includes an operation input unit configured to receive an operation from the manager, and a control command unit configured to transmit, to the device control unit, a control requirement corresponding to the operation of the operation input unit. The device control unit is configured to transmit the control command corresponding to the control requirement from the control command unit.

In the device management system, more preferably, the management apparatus includes a timer configured to acquire time information indicating the present time. The information storage unit is configured to store an operation schedule including a combination of the control command and execution time for each device. When the time information corresponds to the execution time of the operation schedule, the device control unit is configured to transmit the control command of the operation schedule to a target device. The management apparatus further includes a schedule registration unit that is configured to add, when the device control unit receives the control requirement from the control command unit, a new operation schedule to the information storage unit based on the control requirement and the time information at the receiving time of the control requirement.

In the device management system, more preferably, the information storage unit is configured to store a history of the operation state of each device as a control history together with the time information. When adding a new operation schedule, the schedule registration unit is configured to determine, as a control leaving time, the time when a control against the operation schedule stored in the information storage unit has been performed, based on the operation schedule and the control history, and the schedule registration unit is configured to set a time before the time when the control requirement has been received from the portable terminal as the execution time of the new operation schedule so that the execution time is close to the control leaving time.

In the device management system, more preferably, the portable terminal further includes a map storage unit in which map information showing a map of the management area is stored and a route presentation unit configured to present a patrol route that is searched for on the map based on the terminal position information and the device position information.

In the device management system, more preferably, the route presentation unit is configured to present the patrol route searched for based on a preset high-priority item so that the portable terminal passes within the predetermined distance in a sequence determined based on the high-priority item.

More preferably, when a moving distance from the portable terminal to a target device along a route on the map of the management area stored in the map storage unit is the predetermined distance or shorter, the information analysis unit is configured to make the presentation unit present the energy usage information of the target device.

In the device management system, more preferably, the portable terminal further includes an item presentation unit configured to present predetermined confirmation items, and a check processing unit configured to place a check mark indicating the completion of confirmation for each confirmation item in response to an operation from the manager.

A program of the present invention is executed by a computer constituting the management apparatus or portable terminal in the device management system, and makes the computer serve as the information analysis unit.

BRIEF DESCRIPTION OF DRAWINGS

Exemplary embodiments of the present invention are described in more detail. Another feature and advantage of the present invention are understood more sufficiently in relation to the following detailed description and added drawings.

FIG. 3A is an explanatory diagram of energy usage information used for the device management system in accordance with the first exemplary embodiment.

FIG. 3B is an explanatory diagram of device position information used for the device management system in accordance with the first exemplary embodiment.

FIG. 3C is an explanatory diagram of an operation schedule used for the device management system in accordance with the first exemplary embodiment.

FIG. 8 is an explanatory diagram showing another display screen of the portable terminal in the device management system in accordance with the first exemplary embodiment.

DESCRIPTION OF EMBODIMENTS (First Embodiment)

Figure 2:
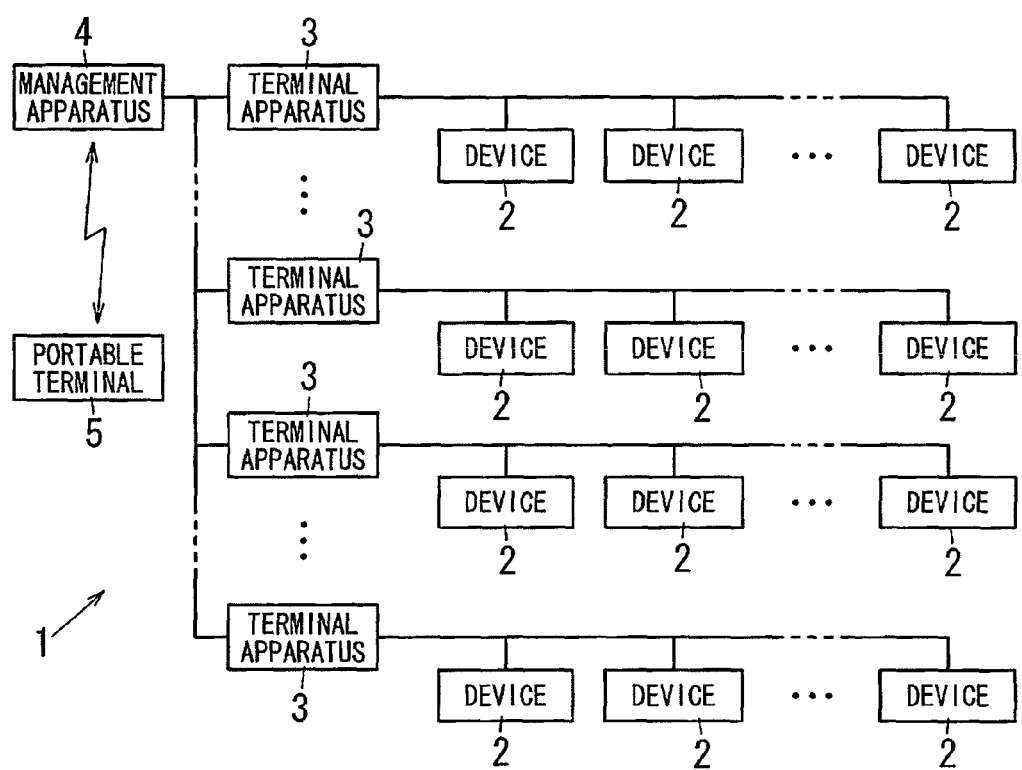
FIG. 2 is a system configuration diagram of the device management system in accordance with the first exemplary embodiment.

A device management system 1 of the present embodiment includes a plurality of devices 2, a plurality of terminal apparatuses 3 connected to the devices 2, a management apparatus 4 for managing the devices 2, and a portable terminal 5 carried by a manager, as shown in FIG. 2. In the example of FIG. 2, the plurality of terminal apparatuses 3 are connected to one management apparatus 4, and a plurality of devices 2 are connected to each terminal apparatus 3.

The plurality of devices 2 are dispersedly disposed at a plurality of positions in a management area. As the devices 2, an illumination device and air conditioner are used. The devices 2 (illumination devices and air conditioners) of the same type are connected to the same terminal apparatus 3.

Even devices 2 of the same type are classified into a plurality of blocks in response to the installation place and application, and the devices 2 belonging to the same block are connected to the same terminal apparatus 3. Different blocks to which the devices 2 belong correspond to different terminal apparatuses 3. In the present embodiment, a 15-story building is set as the management area, for example. The present invention is not limited to this example. The management area may be set to a construction other than a building, or the outdoors such as a park.

Each terminal apparatus 3 is connected to at least one device 2, performs on-off control of the current carrying to the connected device 2 with a relay, and dimming-controls the device 2 formed of an illumination device. In the present embodiment, thus, the operation state of each device 2 is controlled by the terminal apparatus 3. Therefore, the using state (e.g. ON or OFF) of the energy (here, electric energy) of each device 2 is managed by the terminal apparatus 3. The energy managed by the terminal apparatus 3 may be water or gas instead of electric energy (electric power) depending on the type of the device 2. The terminal apparatus 3 is connected to the management apparatus 4 via a communication line, and communicates with the management apparatus 4 by a time-division multiplex method using a transmission signal sent from the management apparatus 4 to the communication line. The devices 2 and the terminal apparatus 3 may be integrated.

Figure 1:
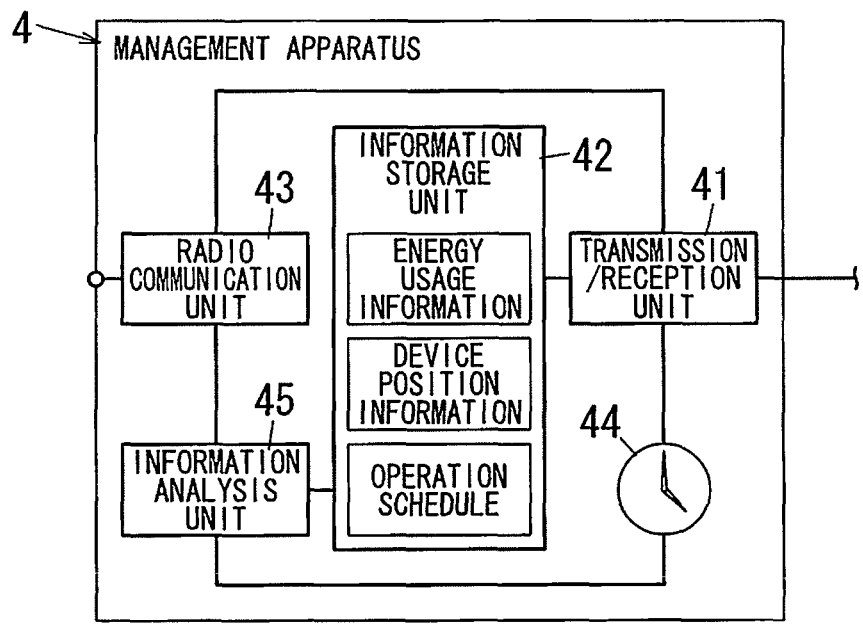
FIG. 1A is a block diagram of a management apparatus of a device management system in accordance with a first exemplary embodiment.
FIG. 1B is a block diagram of a portable terminal of the device management system in accordance with the first exemplary embodiment.
Figure 1:
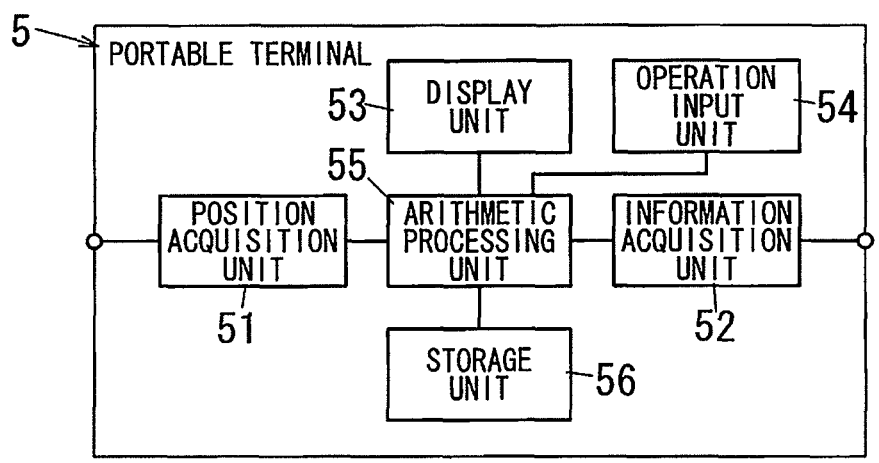

As shown in FIG. 1A, the management apparatus 4 includes a transmission/reception unit 41 for transmitting and receiving data from each terminal apparatus 3, an information storage unit 42 for storing information, a radio communication unit 43 for radio-communicating with the portable terminal 5, a timer 44, and an information analysis unit 45 (described later). The timer 44 acquires time information indicating the present time. In the present embodiment, the management apparatus 4 is formed of a computer whose main components are a central processing unit (CPU) and a memory. The management apparatus 4 executes a predetermined program to fulfill functions as the transmission/reception unit 41, information storage unit 42, radio communication unit 43, timer 44, and information analysis unit 45.

The transmission/reception unit 41 includes an information collection unit for collecting, from the terminal apparatus 3, information (energy usage information) which indicates the using state of energy of the devices 2, by communication with the terminal apparatus 3 using a transmission signal. The transmission/reception unit 41 sequentially communicates with the plurality of terminal apparatuses 3 to regularly (e.g. one-minute interval) collect the energy usage information of each device 2 from each terminal apparatus 3. The transmission/reception unit 41 writes the collected energy usage information into the information storage unit 42 as needed in correspondence with the time information acquired by the timer 44.

The information storage unit 42 stores, for each device 2, the energy usage information collected by the transmission/reception unit 41. Since the transmission/reception unit 41 regularly collects the energy usage information of each device 2, the energy usage information is stored in the information storage unit 42 in time sequence in correspondence with the time information (here, acquisition date and time) as shown in FIG. 3A. In the present embodiment, the information storage unit 42 sets several days as a storage period of energy information, and accumulates the energy usage information corresponding to the past several days back from the present time.

In the example of FIG. 3A, at "YYYY/MM/DD 00:01", the energy usage information of "illumination R1-1" and "illumination R1-2", which are devices 2, is "ON", and the energy usage information of "air conditioner Tm-2" and "air conditioner Tm-X" is "OFF". Similarly, at "YYYY/MM/DD 24:00", the energy usage information of "illumination R1-2" and "air conditioner Tm-X", which are devices 2, is "ON", and the energy usage information of "illumination R1-1" and "air conditioner Tm-2" is "OFF".

Furthermore, the information storage unit 42 stores device position information indicating the position of each device 2 in the management area. In the device position information, as shown in FIG. 3B, the position of the device 2 in a horizontal surface is represented by Cartesian coordinate system (X, Y), and the vertical position of the device 2 is represented by a floor number (Z) of the building. Such device position information is set by for example the constructor of the device management system 1 with a personal computer or the like, is captured by the management apparatus 4, and is previously registered in the information storage unit 42. When a device 2 is added or a device 2 is replaced with another device 2 in the device management system 1, the constructor or the like also resisters the device position information of the new device 2 in the information storage unit 42.

In the example of FIG. 3B, the device position information of "illumination R1-1" is (X, Y, Z)=(10.000, 5.000, 5.000), and that of "illumination R1-2" is (X, Y, Z)=(12.000, 5.000, 5.000). Similarly, the device position information of "air conditioner Tm-2" is (X, Y, Z)=(24.000, 20.000, 10.000), and that of "air conditioner Tm-X" is (X, Y, Z)=(10.000, 10.000, 15.000).

In the present embodiment, the management apparatus 4 and the terminal apparatuses 3 define a device control system for controlling the devices 2. In other words, an individual address is assigned to each terminal apparatus 3, and the transmission/reception unit 41 of the management apparatus 4 specifies an address with a transmission signal, and transmits a control command to the terminal apparatus 3 connected to the device 2 to be controlled. The control command has a control content for specifying how to control the device 2, namely specifying the operation state of the device 2 after the control. On receiving the control command, the terminal apparatus 3 controls the device 2 in response to the control command. In other words, the transmission/reception unit 41 defines a device control unit that controls the operation of the device in response to the control command by transmitting the control command to the terminal apparatus 3.

The information storage unit 42, as shown in FIG. 3C, stores an operation schedule including a combination of the device 2 to be controlled, the control command (control content), and the execution time. The operation schedule is set by for example the manager with a personal computer or the like, is captured by the management apparatus 4, and is previously registered in the information storage unit 42. When the time information acquired by the timer 44 corresponds to the execution time of the operation schedule, the transmission/reception unit 41 as a device control unit transmits the control command of the operation schedule to the target device 2. Thus, the management apparatus 4 can automatically control the device 2 according to the operation schedule.

In the example of FIG. 3C, an operation schedule is set for each schedule number (001 to ppp), and each operation schedule also includes "execution day of the week" specifying the day of the week on which each operation schedule is employed. In other words, in the example of FIG. 3C, on all days of Sunday to Saturday, the management apparatus 4 performs control where "illumination R1-1" is set at "ON" at "10:00" (schedule 001) and is set at "OFF" at "20:00" (schedule 002).

The operation states of the devices 2 are not only automatically controlled according to the operation schedule, but also controlled in response to the operations of switches (not shown) such as a wall switch disposed in each place in the management area. In the device control system, each device 2 may be individually controlled, or a plurality of devices 2 may be controlled collectively as one group.

The radio communication unit 43 has at least a function of transmitting the energy usage information stored in the information storage unit 42 to the portable terminal 5 by radio communication with the portable terminal 5. The radio communication unit 43 receives, from the portable terminal 5, the terminal position information indicating the present position of the portable terminal 5 by radio communication, and transmits, to the portable terminal 5, the energy usage information as a return to the terminal position information. This process is described later.

The portable terminal 5 is formed of a transportable terminal such as a portable phone terminal, personal digital assistant (PDA), or smartphone, and is carried by a manager who patrols the management area.

The portable terminal 5, as shown in FIG. 1B, includes a position acquisition unit 51 for acquiring terminal position information, an information acquisition unit 52 for radio-communicating with the radio communication unit 43, a display unit 53 and operation input unit 54 as user interfaces, and an arithmetic processing unit 55 and storage unit 56. The display unit 53 and operation input unit 54 are formed of a touch panel display, the display unit 53 displays various information, and the operation input unit 54 receives an operation from the manager. The arithmetic processing unit 55 alters the contents displayed on the display unit 53 in response to the operation of the operation input unit 54. In the present embodiment, the portable terminal 5 is formed of a computer whose main components are a CPU and a memory. The portable terminal 5 executes a predetermined program to fulfill functions as the position acquisition unit 51, information acquisition unit 52, display unit 53, operation input unit 54, arithmetic processing unit 55, and storage unit 56.

The position acquisition unit 51, using a global positioning system (GPS), acquires position information indicating the present position of the portable terminal 5 itself as the terminal position information. In order to reduce the error of the terminal position information, the position acquisition unit 51 may include a relatively accurate differential GPS (DGPS) or may determine the position of the portable terminal 5 by a combined use of a gyroscopic sensor and acceleration sensor. The position acquisition unit 51 acquires the terminal position information of the vertical direction based on the floor number (Z) of the patrolled building that is input by the manager with the operation input unit 54, for example.

The information acquisition unit 52 acquires the energy usage information from the management apparatus 4 by radio communication. In the present embodiment, the information acquisition unit 52 transmits the terminal position information acquired by the position acquisition unit 51 to the management apparatus 4 by radio communication, and receives, from the management apparatus 4, the energy usage information as a return to the terminal position information.

The display unit 53 displays the energy usage information acquired by the information acquisition unit 52. The display unit 53 defines a presentation unit for presenting the energy usage information to the manager. The presentation unit is not limited to the display unit 53 that displays the energy usage information. The presentation unit may have a configuration that presents the energy usage information to the manager by voice for example.

In the present embodiment, the information analysis unit 45 disposed in the management apparatus 4 selects the energy usage information to be displayed on the display unit 53 of the portable terminal 5 from the energy usage information stored in the information storage unit 42. The information acquisition unit 52 does not acquire the whole energy usage information stored in the information storage unit 42, but acquires, from the management apparatus 4, only the energy usage information selected by the information analysis unit 45. Hereinafter, the information analysis unit 45 is described.

The information analysis unit 45 searches for a device 2 existing within a predetermined distance from the portable terminal 5 in the management area, namely a device 2 positioned near the portable terminal 5, based on the terminal position information received from the portable terminal 5 by the radio communication unit 43 and the device position information stored in the information storage unit 42. In other words, the terminal position information indicates the present position of the portable terminal 5, and the device position information indicates the position of the device 2, so that the information analysis unit 45 can determine the distance from the portable terminal 5 to each device 2 using the information. Specifically, the information analysis unit 45 addresses only the device 2 existing on the same floor as the portable terminal 5 of the management area, and determines the distance between the device 2 and the portable terminal 5 based on the present coordinate position of the portable terminal 5 and the coordinate position of the device 2. Therefore, based on the terminal position information and the device position information, the information analysis unit 45 can search for a device 2 that is separate from the portable terminal 5 by the predetermined distance or shorter.

The information analysis unit 45 reads, from the information storage unit 42, the energy usage information of the device 2 that exists near the portable terminal 5 and is searched for in the above-mentioned manner, and transmits it from the radio communication unit 43 to the information acquisition unit 52 of the portable terminal 5. Thus, the information acquisition unit 52 acquires only the energy usage information of the device 2 that is positioned near the portable terminal 5, so that the display unit 53 displays only the energy usage information of the device 2 that is positioned near the portable terminal 5.

Figure 4:
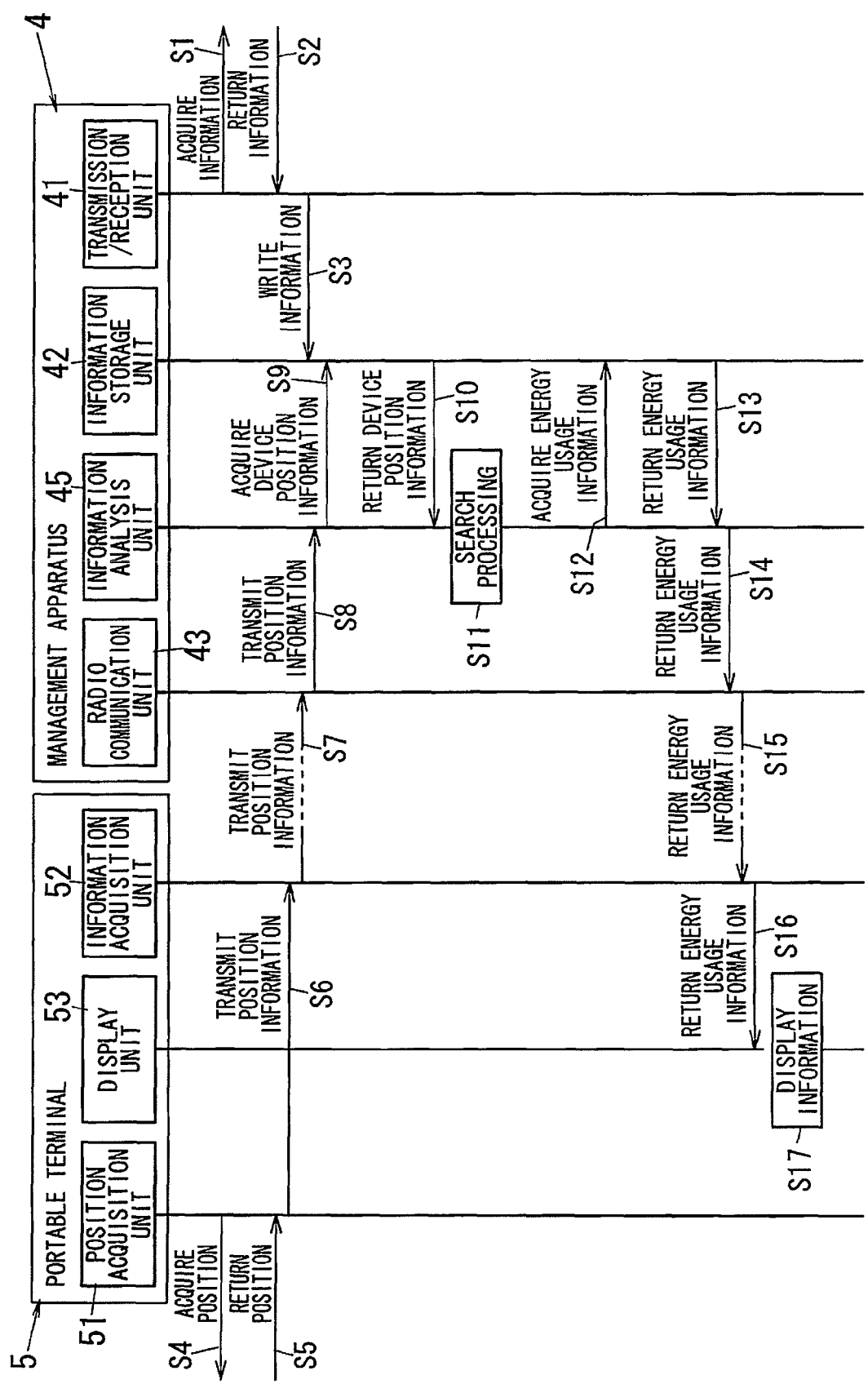
FIG. 4 is an explanatory diagram showing an operation of the device management system in accordance with the first exemplary embodiment.

Next, the operation of the device management system 1 having the above-mentioned configuration is described with reference to FIG. 4.

The management apparatus 4 collects the energy usage information from the terminal apparatuses 3 with the transmission/reception unit 41 (S1 and S2 of FIG. 4), and writes the collected energy usage information into the information storage unit 42 (S3). The portable terminal 5 acquires the terminal position information with the position acquisition unit 51 (S4 and S5), and transmits the acquired terminal position information from the information acquisition unit 52 to the management apparatus 4 (S6 and S7).

The management apparatus 4 reads the terminal position information acquired with the radio communication unit 43 into the information analysis unit 45 (S8). Then, the information analysis unit 45 reads the device position information from the information storage unit 42 (S9 and S10), and, based on the terminal position information and device position information, executes search processing of searching for a device 2 positioned near the portable terminal 5 (S11). The information analysis unit 45 reads, from the information storage unit 42, the energy usage information of the device 2 searched for by search processing (S12 and S13), and transmits the read energy usage information from the radio communication unit 43 to the portable terminal 5 (S14 and S15).

Then, the portable terminal 5 transmits, to the display unit 53, the energy usage information acquired by the information acquisition unit 52 (S16), and displays the energy usage information with the display unit 53, thereby presenting it to the manager (S17).

In the described device management system 1 of the present embodiment, a manager can easily manage the using state of the energy of the devices 2 that are dispersedly disposed at a plurality of positions of a management area, only by patrolling the management area while carrying the portable terminal 5. In other words, in the present embodiment, based on the terminal position information and device position information, the information analysis unit 45 of the management apparatus 4 searches for a device 2 existing within a predetermined distance from the portable terminal 5 in the management area, and makes the display unit 53 display the energy usage information of the searched device 2. In other words, the portable terminal 5 carried by the manager can sequentially present, to the manager, the energy usage information of the searched device 2 existing near the manager in response to the movement of the manager.

Therefore, even a manager who does not have a technical knowledge related to the devices 2 (for example, a manager who does not accurately understand the arrangement and the number of the devices 2 installed in the management area) easily manages the using state of the energy of each device 2 during patrol of the management area. In other words, even when a manager unfamiliar with the worksite patrols it, the manager can easily find the forgetting to turn off or on a device 2 during patrol by carrying the portable terminal 5. Therefore, the manager easily determines the existence of unnecessary energy consumption of each device 2 based on the using state of energy of each device 2. For example, when forgetting to turn off an illumination device occurs, the manager can suppress unnecessary energy consumption by early finding the forgetting.

In the above-mentioned example, the information analysis unit 45 makes the display unit 53 display the whole energy usage information of the device 2 existing within a predetermined distance from the portable terminal 5. The present invention is not limited to this. Only the energy usage information requiring the presentation may be displayed on the display unit 53. In this case, using the energy usage information of the device 2 and a predetermined determination rule, the information analysis unit 45 determines whether the using state of the energy by the device 2 is reasonable or not. Based on the determination result, the information analysis unit 45 classifies the energy usage information into information requiring the presentation and information requiring no presentation.

Specifically, the information analysis unit 45 uses the operation schedule in the information storage unit 42 as the determination rule, and determines whether the using state of the energy is reasonable or not based on whether the operation state of the device 2 that is indicated by the energy usage information matches with the control command that is determined by the operation schedule. When unnecessary energy consumption is caused by forgetting to turn off the device 2 or the other mistakes, or when the amount of energy used (amount of consumption) exceeds a defined value, the information analysis unit 45 determines that the using state of the energy by the device 2 is not reasonable, namely is abnormal. When a certain device 2 is in the ON state out of the period (operation period) in which the device 2 is determined to be in the ON state by the operation schedule, or when the amount of energy used exceeds a defined value, the information analysis unit 45 determines that the using state of the energy is not reasonable. For example, when there is forgetting to turn off an illumination device that has been manually turned on out of the operation period, the information analysis unit 45 determines that the using state of the energy by this illumination device is not reasonable.

The information analysis unit 45 determines, as information requiring no presentation, the energy usage information of a device 2 where it is determined that the using state of the energy is reasonable. The information analysis unit 45 determines, as information requiring the presentation, the energy usage information of a device 2 where it is determined that the using state of the energy is not reasonable. In other words, the information analysis unit 45 prevents the display unit 53 from displaying the energy usage information of the device 2 where the using state of the energy is reasonable, of the devices 2 existing within the predetermined distance from the portable terminal 5, and makes the display unit 53 display the energy usage information of the device 2 where the using state is not reasonable.

Figure 5:
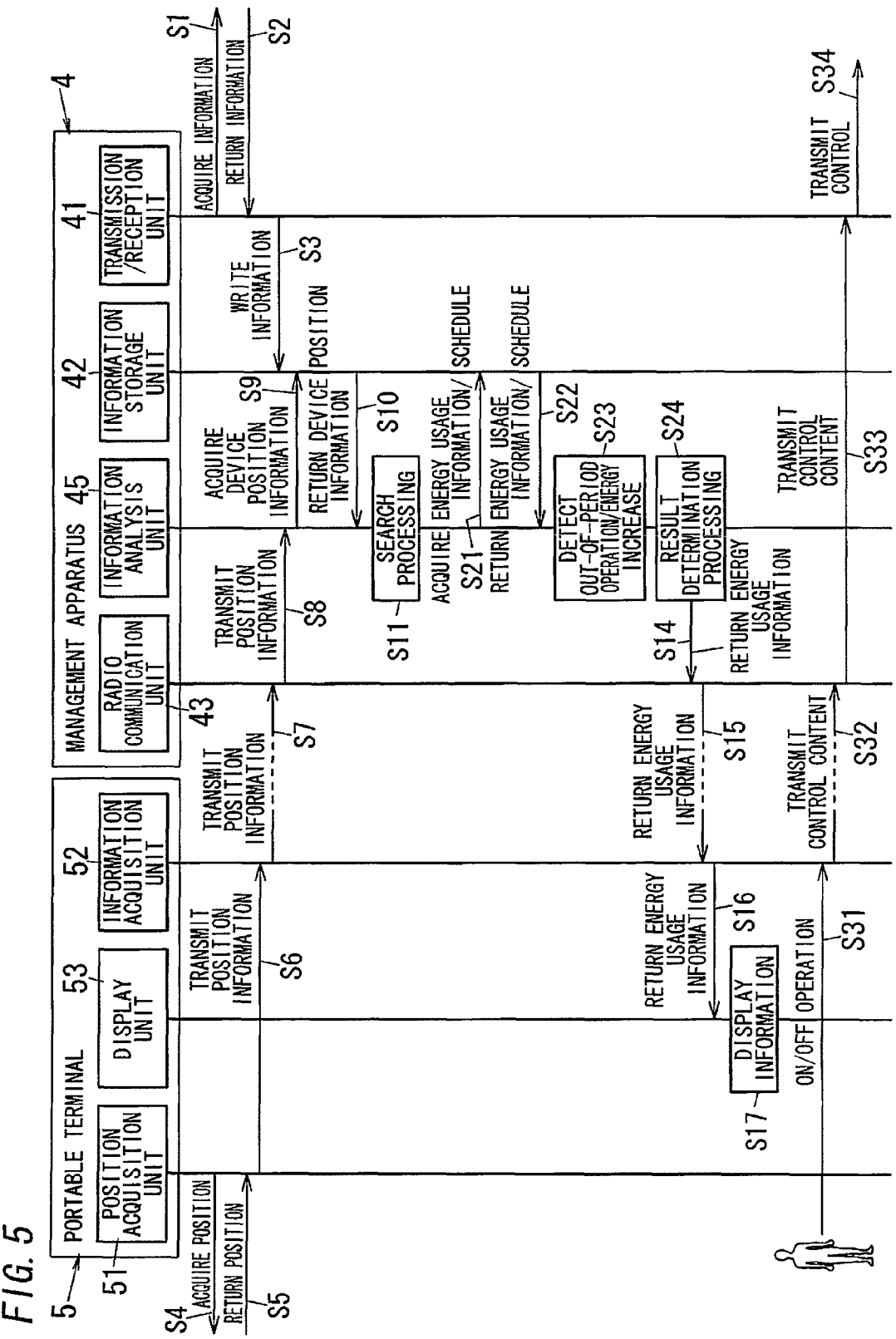
FIG. 5 is an explanatory diagram showing another operation of the device management system in accordance with the first exemplary embodiment.

The operation of the information analysis unit 45 for making the display unit 53 display only the energy usage information of the device 2 where the using state of the energy is not reasonable is described with reference to FIG. 5. In FIG. 5, steps other than S21 to S24 and S31 to S34 (described later) are the same as the steps of FIG. 4, so that the steps common with those of FIG. 4 are not described.

After search processing (S11 of FIG. 5), the information analysis unit 45 reads, from the information storage unit 42, the energy usage information and operation schedule of the device 2 searched for by search processing (S21 and S22). Using the energy usage information and operation schedule, the information analysis unit 45 determines whether the using state of the energy by the device 2 is reasonable or not (S23). Furthermore, the information analysis unit 45 classifies the energy usage information into information requiring the presentation and information requiring no presentation based on the determination result (S24), and transmits only the energy usage information requiring the presentation from the radio communication unit 43 to the portable terminal 5 (S14 and S15).

In such a configuration where the display unit 53 displays only the energy usage information of the device 2 where the using state of the energy is not reasonable, the portable terminal 5 can explicitly present only the problematical device 2 to the manager, and the manager easily finds the device 2 requiring countermeasures. In other words, since the energy usage information of the device 2 where unnecessary energy consumption is caused, of the devices 2 existing near the portable terminal 5, is presented from the portable terminal 5 to the manager, the manager does not need to determine the existence of unnecessary energy consumption. For example, when forgetting to turn off an illumination device occurs, the manager can find the occurrence of the unnecessary energy consumption in the illumination device and suppress the unnecessary energy consumption by early countermeasures even if the manager does not understand the operation period of the illumination device.

In the present embodiment, the arithmetic processing unit 55 of the portable terminal 5 has a function as a control command unit for transmitting a control requirement corresponding to the operation of the operation input unit 54 to the transmission/reception unit 41 as a device control unit of the management apparatus 4. The control requirement has a control content for specifying how to control the device 2, namely specifying the operation state of the device 2 after the control.

The transmission/reception unit 41 of the management apparatus 4 transmits the control command (control content) corresponding to the control requirement from the portable terminal 5 to the target device 2. The management apparatus 4 can control the device 2 in response to the operation of the operation input unit 54 of the portable terminal 5 by the manager.

The portable terminal 5 has, as action mode, display mode of displaying the energy usage information and operation mode of receiving an input of the control requirement. The manager switches the action mode to the operation mode by operating the operation input unit 54 of the portable terminal 5, and then inputs the control requirement with the operation input unit 54. In the operation mode, the display unit 53 displays the information required for an operation of the operation input unit 54. In other words, if the manager, during patrol of the management area, finds forgetting to turn off an illumination device based on the energy usage information displayed on the display unit 53, the manager can instantly turn off the illumination device with the portable terminal 5 to minimize unnecessary energy consumption.

The operation of the device management system 1 in this case is described with reference to FIG. 5.

The manager operates the operation input unit 54 of the portable terminal 5 to input the control requirement for switching between ON and OFF of a certain device 2. Thus, the arithmetic processing unit 55 of the portable terminal 5 transmits the control requirement from the information acquisition unit 52 to the radio communication unit 43 of the management apparatus 4 by radio communication (S31 and S32 of FIG. 5). Then, the radio communication unit 43 sends the received control requirement to the transmission/reception unit 41 as the device control unit (S33), and the transmission/reception unit 41 transmits a control command corresponding to the control requirement to the terminal apparatus 3 (S34).

In such a configuration where the device 2 can be controlled in response to the operation of the portable terminal 5, the manager who patrols the management area can control the operation state of the device 2 with the portable terminal 5 while checking the energy usage information of the device 2 with the display unit 53 of the portable terminal 5. Therefore, when unnecessary energy consumption occurs in the device 2, the manager can suppress the unnecessary energy consumption by early countermeasures.

Figure 6:
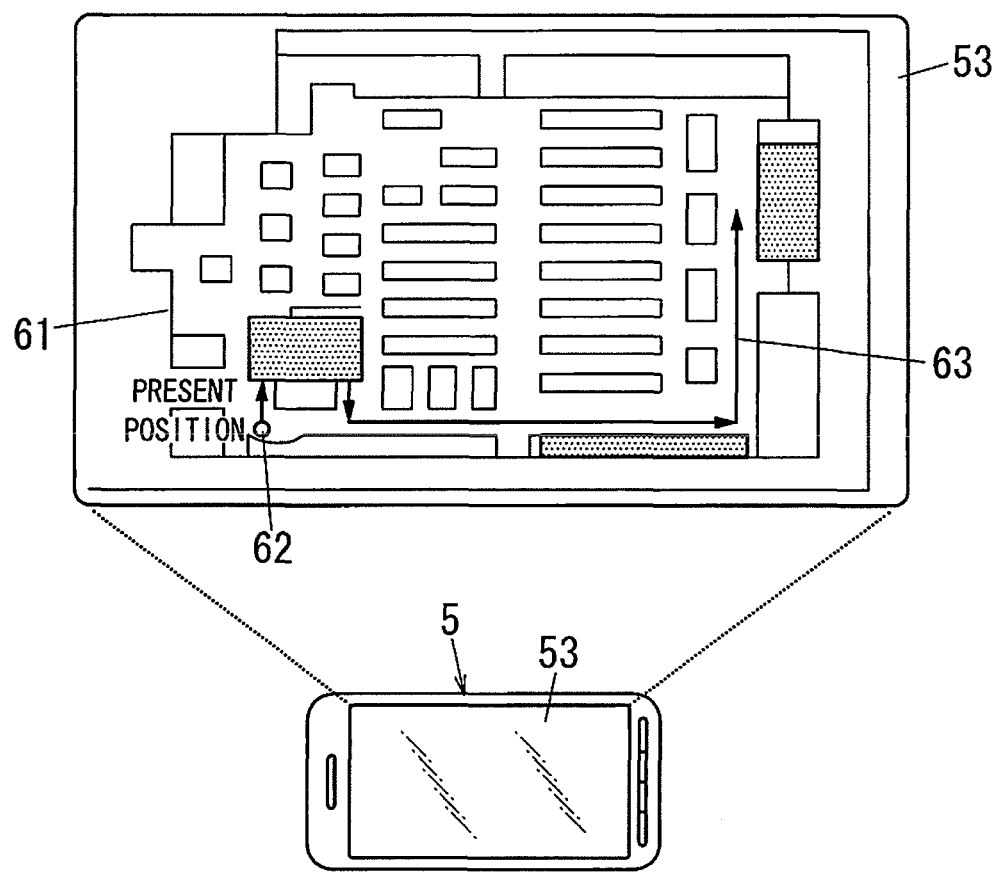
FIG. 6 is an explanatory diagram showing a display screen of the portable terminal in the device management system in accordance with the first exemplary embodiment.

The portable terminal 5 may have the following configuration: the storage unit 56 is used as a map storage unit in which map information showing the map of the management area is stored; and the display unit 53 displays a patrol route that is searched for based on the terminal position information and the device position information on the map. In this case, the display unit 53 defines a route presentation unit for presenting the patrol route to the manager. The portable terminal 5 has, as action mode, route search mode of displaying the patrol route. The manager switches the action mode to the route search mode with the operation input unit 54 of the portable terminal 5, and confirms the patrol route displayed on the display unit 53. As a display example of FIG. 6, the display unit 53 displays, on the map 61 of the management area, a candidate of the patrol route 63 from the present position 62 of the portable terminal 5.

Specifically, the patrol route is searched for by the information analysis unit 45 of the management apparatus 4. The map information is stored also in the information storage unit 42 of the management apparatus 4. The information analysis unit 45 searches for a patrol route where the target devices 2 can be efficiently patrolled based on the present position (terminal position information) of the portable terminal 5 on the map stored in the information storage unit 42 and the positions (device position information) of the devices 2 that are dispersedly disposed at a plurality of positions. Here, the information analysis unit 45 searches for the patrol route so that the portable terminal 5 passes the proximities (within the predetermined distance) of the devices 2 in a sequence determined based on the preset high-priority item. Examples of the high-priority item that defines the search condition of the patrol route include the following items: the increase amount of energy used is large; the distance from the present position of the portable terminal 5 is short; and the route length for confirmation (patrol) is the shortest. Other high-priority items may be employed.

Figure 7:
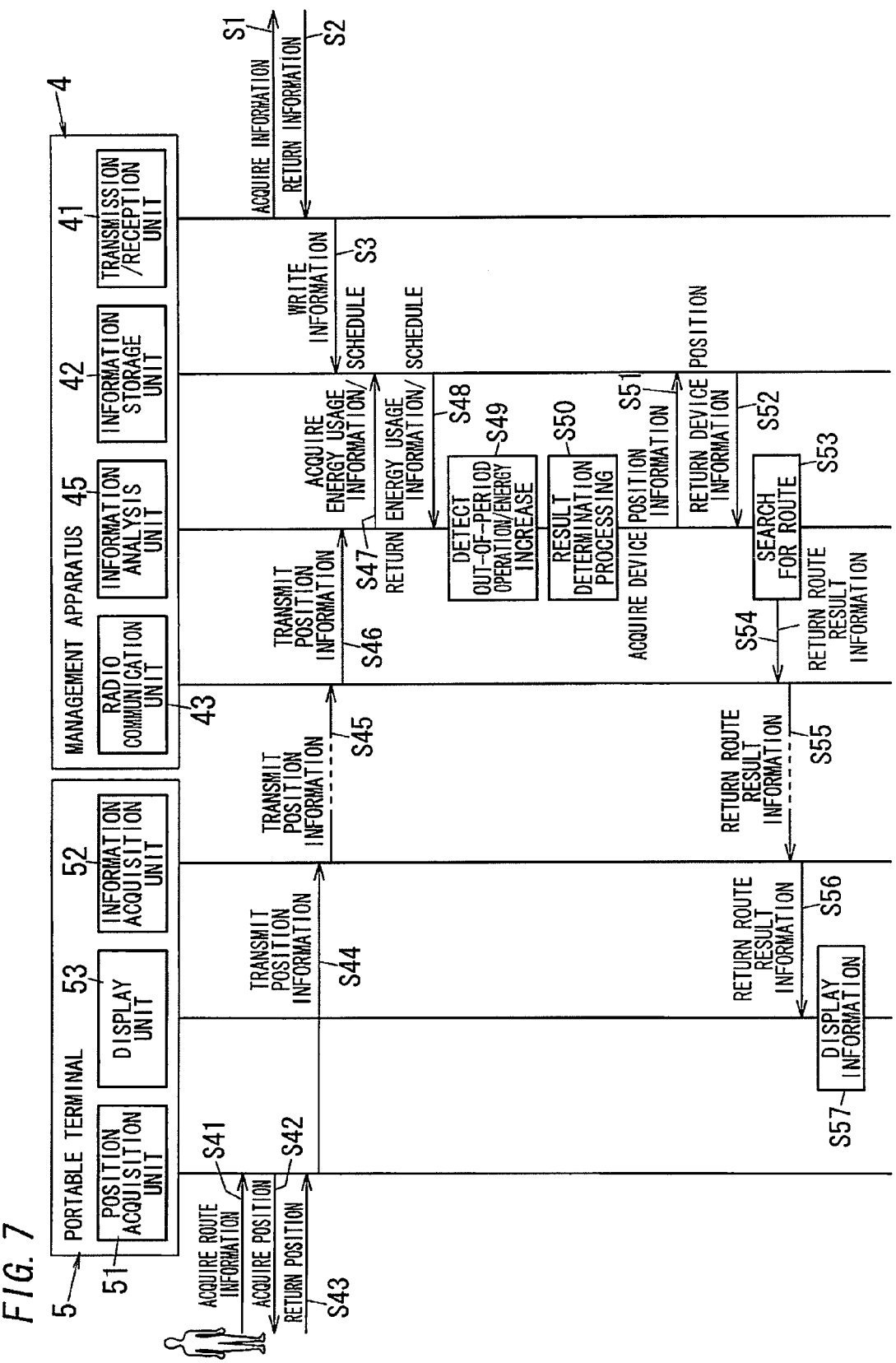
FIG. 7 is an explanatory diagram showing yet another operation of the device management system in accordance with the first exemplary embodiment.

The operation of the device management system 1 in this case is described with reference to FIG. 7.

The management apparatus 4 collects the energy usage information from the terminal apparatuses 3 with the transmission/reception unit 41 (S1 and S2 of FIG. 7), and writes the collected energy usage information into the information storage unit 42 (S3). While, the manager switches the action mode of the portable terminal 5 to the route search mode using the operation input unit 54 of the portable terminal 5 (S41). Thus, the portable terminal 5 acquires the terminal position information with the position acquisition unit 51 (S42 and S43), and transmits the acquired terminal position information from the information acquisition unit 52 to the management apparatus 4 (S44 and S45).

The management apparatus 4 reads the terminal position information acquired with the radio communication unit 43 into the information analysis unit 45 (S46). Then, the information analysis unit 45 reads the energy usage information and operation schedule of all or a part of the devices 2 from the information storage unit 42 (S47 and S48), and, based on them, determines whether the using states of the energy by the devices 2 are reasonable or not (S49). Furthermore, the information analysis unit 45 classifies the energy usage information into information requiring the patrol and information requiring no patrol based on the determination result (S50), and reads device position information of the device 2 requiring the patrol from the information storage unit 42 (S51 and S52). Then, based on the terminal position information and device position information on the map, the information analysis unit 45 executes route search processing of searching for a patrol route (S53).

The information analysis unit 45 transmits the patrol route searched for by the route search processing from the radio communication unit 43 to the portable terminal 5 (S54 and S55). Then, the portable terminal 5 transmits, to the display unit 53, the patrol route acquired by the information acquisition unit 52 (S56), and displays the patrol route with the display unit 53, thereby presenting it to the manager (S57).

In such a configuration where the portable terminal 5 can present the patrol route, the manager can patrol the management area efficiently when the manager patrols the management area while confirming the patrol route with the display unit 53 of the portable terminal 5. In other words, even a manager who does not understand the arrangement of the devices 2 in the management area can efficiently patrol the management area while checking the energy usage information of the devices 2. Here, the information analysis unit 45 may search for a patrol route of only the devices 2 where the using state of the energy is not reasonable. Thus, the period for the patrol can be significantly shortened.

When map information is stored in the information storage unit 42, the information analysis unit 45 may use the map information for the search processing of the device 2 positioned near the portable terminal 5. In other words, in order to search for a device 2 existing within a predetermined distance from the portable terminal 5 in the management area, the information analysis unit 45 may search for the device 2 where the linear distance from the portable terminal 5 is within the predetermined distance, or may search for the device 2 where the moving distance along the route on the map is within the predetermined distance.

Furthermore, when the high-priority item is set as the search condition of the patrol route, the manager can preferentially patrol the devices 2 specified in response to the high-priority item. The specified devices 2 are, for example, devices 2 where the increase in amount of energy used is large, or devices 2 that are close to the present position of the portable terminal 5. Therefore, the manager can patrol more efficiently, and there is an advantage that the load of the patrol is reduced.

The portable terminal 5 may have a function of checking predetermined confirmation items. In this case, the portable terminal 5 stores the confirmation items in the storage unit 56, and displays the confirmation items on the display unit 53. The arithmetic processing unit 55 of the portable terminal 5 has a function of placing a check mark indicating the completion of confirmation for each confirmation item in response to an operation of the operation input unit 54 from the manager. In other words, the display unit 53 defines an item presentation unit, and the arithmetic processing unit 55 defines a check processing unit.

Specifically, the storage unit 56 previously stores a plurality of confirmation items for each item number. The confirmation items may be items related to the operation of the devices 2 such as "Turn off the illumination device in the center on the first floor" and "Turn off the air conditioner at the left end on the first floor", or may be items that are not related to the devices 2 such as "Lock the door of the front surface on the first floor" and "Lock for final leaving". The arithmetic processing unit 55 makes the display unit 53 display these confirmation items in a form (check form) shown in FIG. 8. In the example of FIG. 8, the content 72 of the confirmation item corresponds to a check box 73 for each item number 71. It is preferable that the check of the confirmation items is performed simultaneously with the confirmation of the energy usage information of the devices 2, so that the portable terminal 5 displays the check form as shown in FIG. 8 on the display unit 53 when the action mode is display mode.

Thus, the manager looks at the confirmation item displayed on the display unit 53, and, after the confirmation, can place a check mark in the corresponding check box using the operation input unit 54. Therefore, the manager can, not only manage the energy usage information of the devices 2, but also check a confirmation item that is not related to the devices 2 using only one portable terminal 5. Thus, the efficiency of the patrol work becomes high.

In the present embodiment, the information analysis unit 45 is included in the management apparatus 4. However, the present invention is not limited to this configuration. The information analysis unit may be included in the portable terminal 5, or may be separate from the management apparatus 4 and the portable terminal 5. When the information analysis unit is included in the portable terminal 5, a computer defining the portable terminal 5 achieves a function as the information analysis unit by executing a predetermined program.

(Second Embodiment)

A device management system 1 in the second embodiment differs from the device management system 1 in the first embodiment in that a management apparatus 4 in the second embodiment includes a schedule registration unit 46 (FIG. 9) for additionally registering a new operation schedule. Hereinafter, the elements similar to those in the first embodiment are denoted with the same reference signs as those in the first embodiment, and the descriptions of those elements are omitted appropriately.

When a transmission/reception unit 41 as a device control unit receives a control requirement from a portable terminal 5, the schedule registration unit 46 creates a new operation schedule and adds it to an information storage unit 42 based on the time information and control requirement at the receiving time of the control requirement. Specifically, the schedule registration unit 46 sets the time information at the receiving time of the control requirement as an execution time, and sets the control requirement as a control command (control content). The schedule registration unit 46 then associates the combination of the execution time and control command with a device 2 as a target for the control requirement, thereby creating a new operation schedule.

Figure 9:
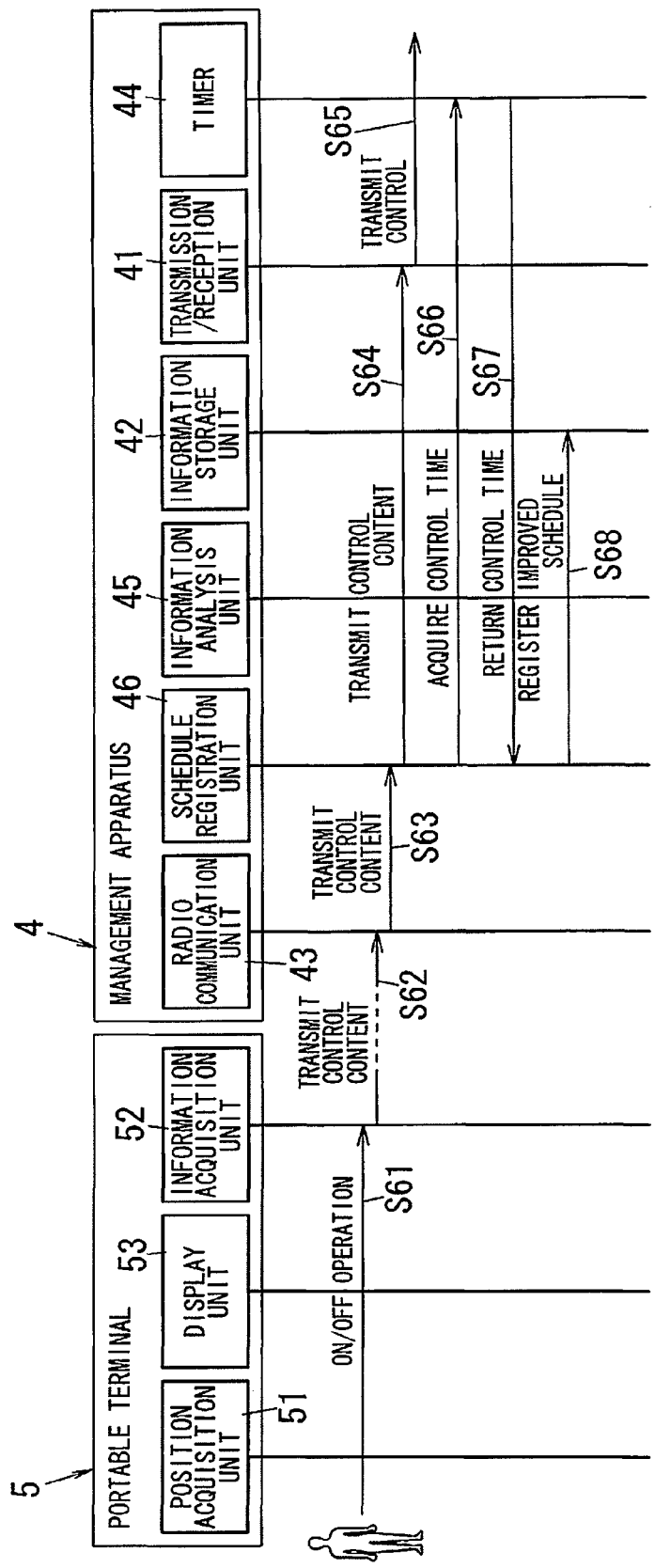
FIG. 9 is an explanatory diagram showing an operation of a device management system in accordance with a second exemplary embodiment.

The operation of the device management system 1 in this case is described with reference to FIG. 9.

The manager inputs a control requirement for switching between ON and OFF of a certain device 2 by operating an operation input unit 54 of the portable terminal 5. Thus, an arithmetic processing unit 55 of the portable terminal 5 transmits the control requirement from an information acquisition unit 52 to a radio communication unit 43 of the management apparatus 4 by radio communication (S61 and S62 of FIG. 9). Then, the radio communication unit 43 sends the received control requirement to the transmission/reception unit 41 as the device control unit via the schedule registration unit 46 (S63 and S64), and the transmission/reception unit 41 transmits a control command corresponding to the control requirement to a terminal apparatus 3 (S65).

At this time, the schedule registration unit 46 acquires, from a timer 44, time information indicating the present time when the control requirement is received (S66 and S67), and creates a new operation schedule based on the time information and control requirement. Then, the schedule registration unit 46 writes the new created operation schedule into the information storage unit 42 (S68).

In the described configuration of the present embodiment, when the manager controls a device 2 by operating the portable terminal 5, the management apparatus 4 additionally registers a similar control as a new operation schedule in the information storage unit 42. Therefore, after the manager controls the device 2 with the portable terminal 5 once at a certain time, the management apparatus 4 automatically controls the device 2 according to the additionally registered operation schedule whenever it gets to the certain time. In other words, generally, forgetting to turning off a device 2 is apt to repeatedly occur, and therefore, by automatically adding an operation schedule as described above, the management apparatus 4 can automatically address the forgetting or the like that occurs later according to the operation schedule.

The schedule registration unit 46 may have a function of setting an execution time at a time before the control requirement is actually received in a new operation schedule to be additionally registered into the information storage unit 42. The configuration in this case is described in details below.

In this case, whenever the operation state of a device 2 varies, the management apparatus 4 acquires the operation state after the variation from the terminal apparatus 3 with the transmission/reception unit 41. The management apparatus 4 stores the history of the operation state of the device 2 as a control history together with the time information into the information storage unit 42. The information storage unit 42 accumulates the control history of each device 2 corresponding to the past several hours back from the present time. In adding a new operation schedule of a certain device 2, the schedule registration unit 46 determines, as a control leaving time, the time when a control against the operation schedule has been performed based on the operation schedule stored in the information storage unit 42 and the control history for the device 2. In other words, the schedule registration unit 46 compares the operation schedule with the control history, and determines, as the control leaving time, the time when the device 2 has been controlled into an operation state different from that of the control command of the operation schedule.

The schedule registration unit 46 sets a time before the time when the control requirement is received from the portable terminal 5 as the execution time of the new operation schedule so that the execution time is close to the control leaving time determined in that manner. The schedule registration unit 46 determines the median value between the control leaving time and the present time (the time when the control requirement is received from the portable terminal 5) for example, and adjusts the execution time within a range between the median value and the present time. The present invention is not limited to this example. The schedule registration unit 46 may determine the median value between the present time and the time when control is finally performed according to the operation schedule, and may adjust the execution time within a range between the median value and the present time.

Figure 10:
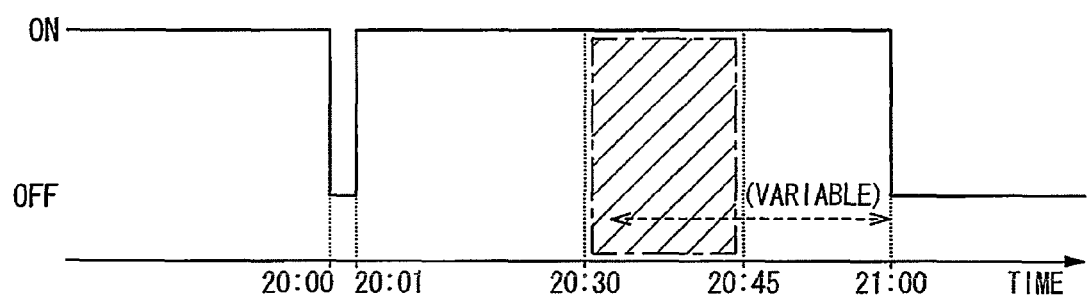
FIG. 10 is an explanatory diagram showing another operation of the device management system in accordance with the second exemplary embodiment.

Hereinafter, the processing where the schedule registration unit 46 sets the execution time ahead of schedule is described with reference to FIG. 10 showing a specific example. The example of FIG. 10 shows the situation where an illumination device, which is determined to be in the OFF state after 20:00 by the operation schedule in the information storage unit 42, is manually turned on for work by a user at 20:01.

In FIG. 10, the time (20:01) when the illumination device is manually turned on by the user is the control leaving time. In this case, if the user forgets to turn off the illumination device after the user finishes the work at 20:30, unnecessary energy consumption occurs in this illumination device after 20:30. At 21:00 after that, the manager finds the forgetting to turn off the illumination device during patrolling the management area, and inputs a control requirement with the portable terminal 5 so as to turn off the illumination device. Thus, the illumination device is turned off (OFF) at 21:00.

At this time, the schedule registration unit 46 creates a new operation schedule where the control command (control content) for this illumination device is set at "OFF", and additionally registers it in the information storage unit 42. Here, the schedule registration unit 46 sets the execution time of the new operation schedule at a time before the present time (21:00) when the control requirement is received from the portable terminal 5 so that the execution time is close to the control leaving time (20:01). In the example of FIG. 10, the schedule registration unit 46 determines the median value (20:30) between the present time and the time (20:00) when the illumination device is finally controlled according to the operation schedule, and adjusts the execution time to the midpoint (20:45) between the median value and the present time.

After that, even if forgetting to turn off the same illumination device repeatedly occurs after 20:30, the management apparatus 4 automatically turns off the illumination device at 20:45 according to the additionally registered operation schedule. Therefore, the period (shaded part of FIG. 10) in which unnecessary energy consumption occurs in this illumination device is shorter than that of the case where the schedule registration unit 46 additionally registers an operation schedule where the execution time is set at the present time. Here, the present time is the time when the control requirement is received from the portable terminal 5.

As discussed above, in the configuration where the schedule registration unit 46 sets the execution time ahead of schedule, the execution time of a new operation schedule is adjusted so as to shorten the occurrence period of unnecessary energy consumption. Therefore, a device management system 1 having a higher energy saving effect can be achieved.

The other configurations and functions are the same as those in the first embodiment.

Several preferable embodiments of the present invention have been described. However, a person skilled in the art can perform various modification and deformation as long as the person does not deviate from the original mind and range, namely the claims, of the present invention.

The invention claimed is:

1. A device management system comprising:
a plurality of devices dispersedly disposed at a plurality of positions in a management area;
a portable terminal carried by a manager who patrols the management area; and
a management apparatus being capable of radio-communicating with the portable terminal,
the management apparatus including:
an information collection unit configured to control energy usage information indicating a using state of energy by the plurality of devices; and
an information storage unit configured to store, for each device, device position information that indicates the positions of the plurality of devices and the energy usage information,
the portable terminal including:
a position acquisition unit configured to acquire terminal position information indicating a present position;
an information acquisition unit configured to acquire the energy usage information from the management apparatus by radio communication; and
a presentation unit configured to present the energy usage information,
wherein at least one of the management apparatus and the portable terminal includes an information analysis unit, the information analysis unit being configured to select the energy usage information to be presented by the presentation unit from the energy usage information stored in the information storage unit, and
wherein, based on the terminal position information and the device position information, the information analysis unit is configured to search the plurality of devices for a device existing within a predetermined distance from the portable terminal in the management area, and is configured to make the presentation unit present the energy usage information of the searched device.

2. The device management system according to claim 1, wherein
the portable terminal further includes:
an item presentation unit configured to present predetermined confirmation items; and
a check processing unit configured to place a check mark indicating a completion of confirmation for each confirmation item in response to an operation from the manager.

3. A program executed by a computer constituting the management apparatus or the portable terminal in the device management system according to claim 1, wherein the program makes the computer serve as the information analysis unit.

4. The device management system according to claim 1, wherein
using a predetermined determination rule and the energy usage information of a device existing within the predetermined distance, the information analysis unit is configured to determine whether a using state of energy by the device existing within the predetermined distance is reasonable or not,
when it is determined that the using state is reasonable, the information analysis unit is configured to prevent the presentation unit from presenting the energy usage information of the device existing within the predetermined distance, and
when it is determined that the using state is not reasonable, the information analysis unit is configured to make the presentation unit present the energy usage information of the device existing within the predetermined distance.

5. The device management system according to claim 4, further comprising a terminal apparatus that is capable of communicating with the management apparatus and controls an operation state of each device, wherein
the management apparatus further includes a device control unit that is configured to control an operation state of each device in response to a control command by transmitting the control command to the terminal apparatus,
the portable terminal further includes an operation input unit configured to receive an operation from the manager, and a control command unit configured to transmit, to the device control unit, a control requirement corresponding to an operation of the operation input unit, and
the device control unit is configured to transmit the control command corresponding to the control requirement from the control command unit.

6. The device management system according to claim 4, wherein
the portable terminal further includes:
a map storage unit in which map information showing a map of the management area is stored; and
a route presentation unit configured to present a patrol route, the patrol route being searched for on a map based on the terminal position information and the device position information.

7. The device management system according to claim 4, wherein
the portable terminal further includes:
an item presentation unit configured to present predetermined confirmation items; and
a check processing unit configured to place a check mark indicating a completion of confirmation for each confirmation item in response to an operation from the manager.

8. A non-transitory computer readable medium storing a program executed by a computer constituting the management apparatus or the portable terminal in the device management system according to claim 4, wherein the program makes the computer serve as the information analysis unit.

9. The device management system according to claim 4, further comprising a terminal apparatus that is capable of communicating with the management apparatus and controls an operation state of each device, wherein
the management apparatus further includes a device control unit configured to control an operation state of each device in response to a control command by transmitting the control command to the terminal apparatus,
the management apparatus further includes a timer configured to acquire time information indicating a present time,
the information storage unit is configured to store an operation schedule including a combination of a control command and an execution time for each device, and
using the operation schedule as the predetermined determination rule, the information analysis unit is configured to determine whether a using state of energy by a device existing within the predetermined distance is reasonable or not.

10. The device management system according to claim 9, further comprising a terminal apparatus that is capable of communicating with the management apparatus and controls an operation state of each device, wherein
the management apparatus further includes a device control unit that is configured to control an operation state of each device in response to a control
command by transmitting the control command to the terminal apparatus, the portable terminal further includes an operation input unit configured to receive an operation from the manager, and a control command unit configured to transmit, to the device control unit, a control requirement corresponding to an operation of the operation input unit, and
the device control unit is configured to transmit the control command corresponding to the control requirement from the control command unit.

11. The device management system according to claim 9, wherein
the portable terminal further includes:
a map storage unit in which map information showing a map of the management area is stored; and
a route presentation unit configured to present a patrol route, the patrol route being searched for on a map based on the terminal position information and the device position information.

12. The device management system according to claim 9, wherein
the portable terminal further includes:
an item presentation unit configured to present predetermined confirmation items; and
a check processing unit configured to place a check mark indicating a completion of confirmation for each confirmation item in response to an operation from the manager.

13. A non-transitory computer readable medium storing a program executed by a computer constituting the management apparatus or the portable terminal in the device management system according to claim 9, wherein the program makes the computer serve as the information analysis unit.

14. The device management system according to claim 1, further comprising a terminal apparatus that is capable of communicating with the management apparatus and controls an operation state of each device, wherein
the management apparatus further includes a device control unit that is configured to control an operation state of each device in response to a control command by transmitting the control command to the terminal apparatus,
the portable terminal further includes an operation input unit configured to receive an operation from the manager, and a control command unit configured to transmit, to the device control unit, a control requirement corresponding to an operation of the operation input unit, and
the device control unit is configured to transmit the control command corresponding to the control requirement from the control command unit.

15. The device management system according to claim 14, wherein
- the management apparatus includes a timer configured to acquire time information indicating a present time,
- the information storage unit is configured to store an operation schedule including a combination of a control command and an execution time for each device,
- when the time information corresponds to the execution time of the operation schedule, the device control unit is configured to transmit the control command of the operation schedule to a target device, and
- the management apparatus further includes a schedule registration unit that is configured to add, when the device control unit receives the control requirement from the control command unit, a new operation schedule to the information storage unit based on the control requirement and the time information at a receiving time of the control requirement.

16. The device management system according to claim 15, wherein
- the information storage unit is configured to store a history of an operation state of each device as a control history together with the time information, and
- when adding a new operation schedule, the schedule registration unit is configured to determine, as a control leaving time, a time when a control against the operation schedule stored in the information storage unit has been performed, based on the operation schedule and the control history, and is configured to set a time before a time when the control requirement has been received from the portable terminal as an execution time of the new operation schedule so that the execution time is close to the control leaving time.

17. The device management system according to claim 1, wherein
the portable terminal further includes:
- a map storage unit in which map information showing a map of the management area is stored; and
- a route presentation unit configured to present a patrol route, the patrol route being searched for on a map based on the terminal position information and the device position information.

18. The device management system according to claim 17, wherein
the route presentation unit is configured to present the patrol route searched for based on a preset high-priority item so that the portable terminal passes within the predetermined distance in a sequence determined based on the high-priority item.

19. The device management system according to claim 17, wherein
when a moving distance from the portable terminal to a target device along a route on a map of the management area stored in the map storage unit is the predetermined distance or shorter, the information analysis unit is configured to make the presentation unit present the energy usage information of the target device.

* * * * *